United States Patent
Wang et al.

(10) Patent No.: US 7,123,471 B2
(45) Date of Patent: Oct. 17, 2006

(54) SWIVEL DISPLAY INCLINING STRUCTURE

(75) Inventors: Wen-Chieh Wang, Taipei (TW);
Chin-Ku Chuang, Taipei (TW);
Tzu-Wei Lai, Taipei (TW)

(73) Assignee: Tatung Co., LTD, Taipei (TW)

(*) Notice: Subject to any disclaimer, the term of this patent is extended or adjusted under 35 U.S.C. 154(b) by 65 days.

(21) Appl. No.: 11/062,583

(22) Filed: Feb. 23, 2005

(65) Prior Publication Data

US 2006/0114650 A1 Jun. 1, 2006

(30) Foreign Application Priority Data

Dec. 1, 2004 (TW) .............................. 93219346 U

(51) Int. Cl.
*H05K 5/00* (2006.01)
*H05K 7/00* (2006.01)

(52) U.S. Cl. ..................................... 361/681
(58) Field of Classification Search ............... 361/681; 345/173, 179, 178
See application file for complete search history.

(56) References Cited

U.S. PATENT DOCUMENTS

| | | | | |
|---|---|---|---|---|
| 4,916,740 A | * | 4/1990 | Noda et al. | 382/282 |
| 5,619,397 A | * | 4/1997 | Honda et al. | 361/686 |
| 5,644,469 A | * | 7/1997 | Shioya et al. | 361/681 |
| 5,708,458 A | * | 1/1998 | Vrbanac | 345/156 |
| 5,737,183 A | * | 4/1998 | Kobayashi et al. | 361/683 |
| 6,034,866 A | * | 3/2000 | Nobuchi et al. | 361/681 |
| 6,301,101 B1 | * | 10/2001 | Anzai et al. | 361/683 |
| 6,492,974 B1 | * | 12/2002 | Nobuchi et al. | 345/156 |
| 6,778,196 B1 | * | 8/2004 | Nakamura | 361/680 |
| 6,781,824 B1 | * | 8/2004 | Krieger et al. | 361/683 |
| 6,933,921 B1 | * | 8/2005 | Yasuda et al. | 345/157 |
| 6,992,882 B1 | * | 1/2006 | Wang | 361/681 |
| 2004/0141284 A1 | * | 7/2004 | Chen et al. | 361/681 |
| 2004/0201577 A1 | * | 10/2004 | Yamada | 345/173 |
| 2005/0135049 A1 | * | 6/2005 | Huang et al. | 361/683 |
| 2005/0139740 A1 | * | 6/2005 | Chen et al. | 248/286.1 |
| 2006/0119586 A1 | * | 6/2006 | Grant et al. | 345/173 |

* cited by examiner

*Primary Examiner*—Lynn Feild
*Assistant Examiner*—Ingrid Wright
(74) *Attorney, Agent, or Firm*—Lowe Hauptman & Berner LLP

(57) ABSTRACT

A swivel display inclining structure used in a dual-use portable computer is disclosed to include a touch panel pivoted to the top surface of the base member of the portable computer, two spring members for supporting the touch panel in an inclined position relative to the base member of the portable computer to support the swivel display of the portable computer in an inclined open position, two latches slidably mounted on the base member of the portable computer for locking the touch panel to the base member of the portable computer in a received position, and an operating bar for pressing by the user to disengage the latches from the touch panel for enabling the touch panel to be forced outwards from the received position to the inclined position by the spring members for supporting the swivel display in the inclined open position.

8 Claims, 5 Drawing Sheets

SWIVEL DISPLAY INCLINING STRUCTURE

RELATED APPLICATION

The present application is based on, and claims priority from, Taiwan Application No. 093219346, filed Dec. 1, 2004, the disclosure of which is hereby incorporated by reference herein in its entirety.

BACKGROUND OF THE INVENTION

1. Field of the Invention

The present invention relates to a swivel display inclining structure and more particularly, to such a swivel display inclining structure, which is practical for use in a dual-use portable computer for supporting the swivel display of the portable computer in an inclined open position for operation with a touch pen.

2. Description of Related Art

A regular dual-use portable computer generally comprises a base member accommodating a keyboard, and a swivel display pivoted to the base member. The swivel display can be rotated on the base member and turned about an axis relative to the base member between two reversed positions. When the user closed the swivel display on the base member with the display screen of the swivel display facing the outside opposite to the base member, the portable computer is used as a tablet PC. When the user opened the swivel display from the base member with the display screen of the swivel display facing the base member, the portable computer is used as a notebook computer. Therefore, this portable computer is called dual-use portable computer.

However, when using the dual-use portable computer as a tablet PC, the swivel display must be closed on the base member with the display screen facing the outside opposite to the base member for operation with a touch pen. This design is not an orthopedically engineered design. It is not comfortable to operate a touch pen over the display screen of the swivel display that is closed on the base member of the portable computer.

SUMMARY OF THE INVENTION

The present invention has been accomplished under the circumstances in view. According to the present invention, the swivel display inclining structure is used in a dual-use portable computer, which comprises a base member, which has a top surface, and a swivel display, which is pivoted to the top surface and rotatable on the top surface of the base member and turnable relative to the base member.

The swivel display inclining structure comprises a touch panel, at least one latch, at least one spring member, and an operating bar. The touch panel is pivoted to the top surface of the base member, having a locating groove in at least one lateral side thereof, and spring means adapted to impart a prestress to the touch panel to rotate relative to the base member to an inclined position. The at least one latch is respectively slidably mounted in the base member, said at least one latch has a front engagement end and a rear connecting end. The at least one spring member is respectively connected between the at least one latch and the base member and adapted to force the front engagement end of the at least one latch engagement into the locating groove of the touch pane. The operating bar comprises at least one connecting end portion respectively coupled to the rear connecting end of the at least one latch, and a springy convex portion.

When the user pressed the springy convex portion of the operating bar, the operating bar is forced to slide on the base member and to move the front engagement end of the at least one latch away from the locating groove of the touch panel and to unlock the touch panel, for enabling the touch panel to be upwardly rotated relative to the base member to the inclined position by the prestress of the spring means for supporting the swivel display.

Therefore, when the touch panel is set in the inclined position to support the back side of the swivel display, the swivel display is kept in an inclined position relative to the base member. At this time, the user can use a touch pen to operate the portable computer. Because the swivel display is kept in an inclined position relative to the base member at this time, the user can conveniently and comfortably operate the touch pen with less effort.

The operating bar further comprises at least one lever. The at least one lever has a middle part pivoted to the base member, a first end pivoted to the at least one connecting end portion of the operating bar, and a second end pivoted to the rear connecting end of the at least one latch.

Further, the at least one latch has a rear extension rod backwardly extending from the rear connecting end thereof. The at least one spring member is respectively sleeved onto the rear extension rod of the at least one latch.

The operating bar further comprises a press member provided at the top side of the springy convex portion thereof.

The swivel display inclining structure further comprises at least one guide member respectively fastened to the base member, and the at least one guide member having a sliding groove for receiving the operating bar.

Also, the swivel display inclining structure can comprise at least one guide member respectively fastened to the base member, the at least one guide member having a sliding groove for receiving the at least one latch.

The swivel display inclining structure further comprises a base plate installed in the top surface of the base member to secure the touch panel to the base member pivotally.

DETAILED DESCRIPTION OF THE PREFERRED EMBODIMENT

Figure 1:
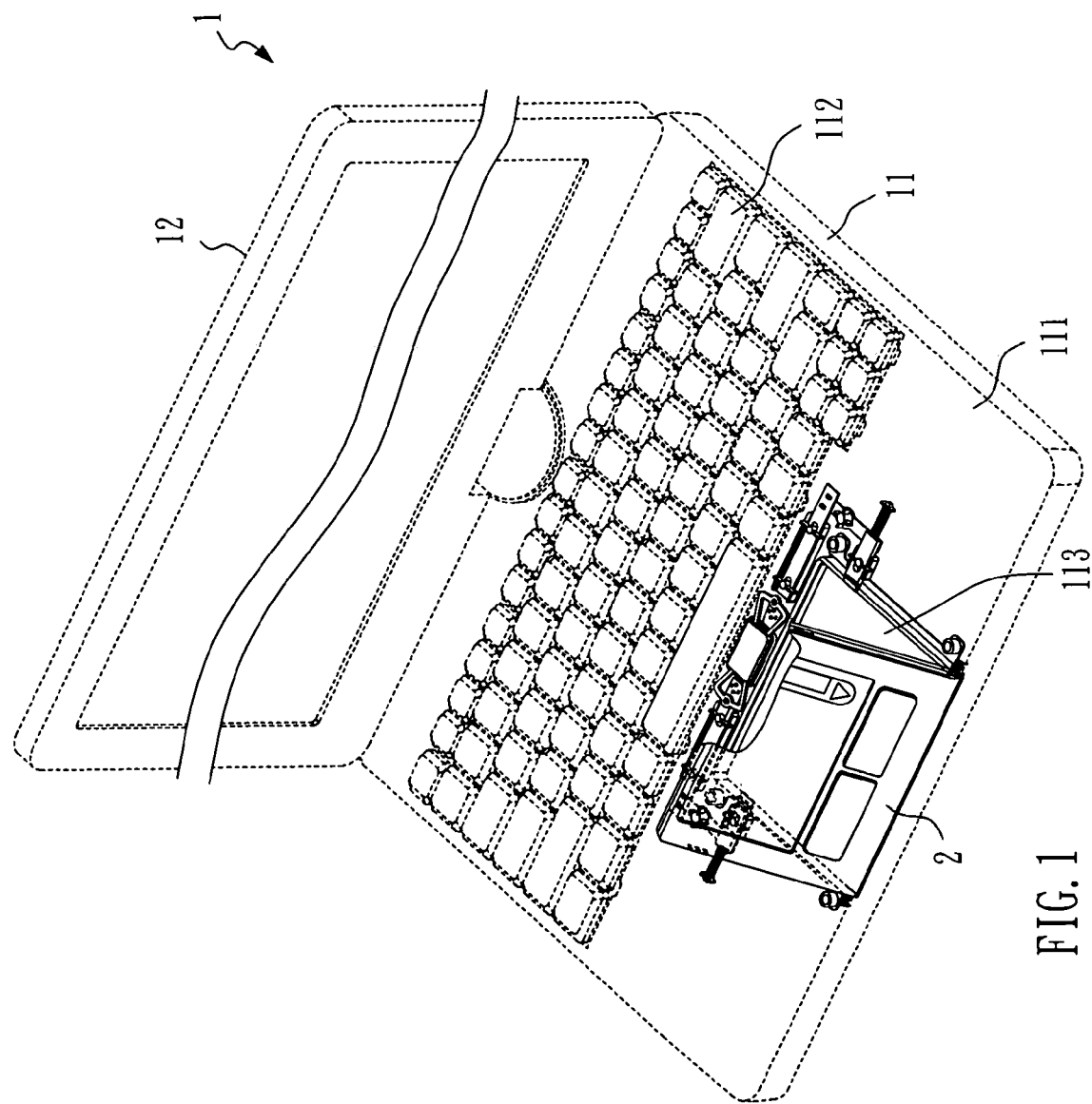
FIG. 1 is a perspective view showing the preferred embodiment of the present invention used in a dual-use portable computer.

Referring to FIG. 1, a dual-use portable computer 1 is shown comprising a base member 11 and a swivel display 12. The base member 11 has a top surface 111. A keyboard 112 and a base plate 113 are installed in the top surface 111 of the base member 11. The swivel display 12 is pivoted to the top surface 111 of the base member 11, and can be rotated and inclined relative to the top surface 111 of the base member 11.

Because the swivel display 12 can be rotated and inclined relative to the top surface 111 of the base member 11, the user can alternatively set the dual-use portable computer 1 between the notebook mode where the swivel display 12 is disposed in an inclined angle with the display screen facing the base member 11 and the tablet PC mode where the swivel display 12 is closed on the top surface 111 of the base member 11 with the display screen kept opposing the base member 11. When the dual-use portable computer 1 is set in the notebook computer mode, the user can operate the keyboard 112 for data entry. On the contrary, when the dual-use portable computer 1 is set in the tablet PC computer mode, the user can use a touch pen 6 (see FIG. 5) for data entry.

Figure 2:
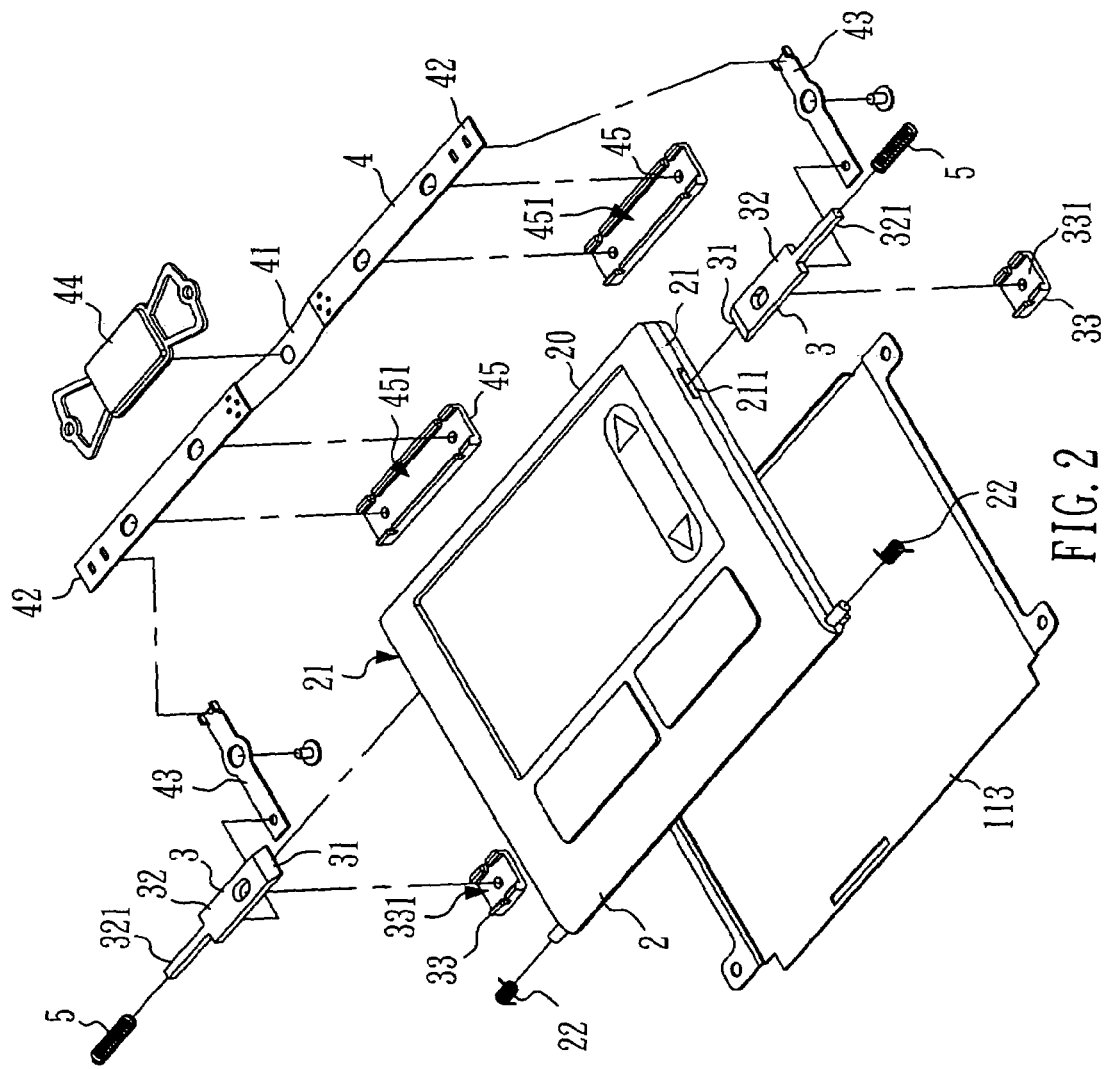
FIG. 2 is an exploded view of the preferred embodiment of the present invention.
Figure 3:
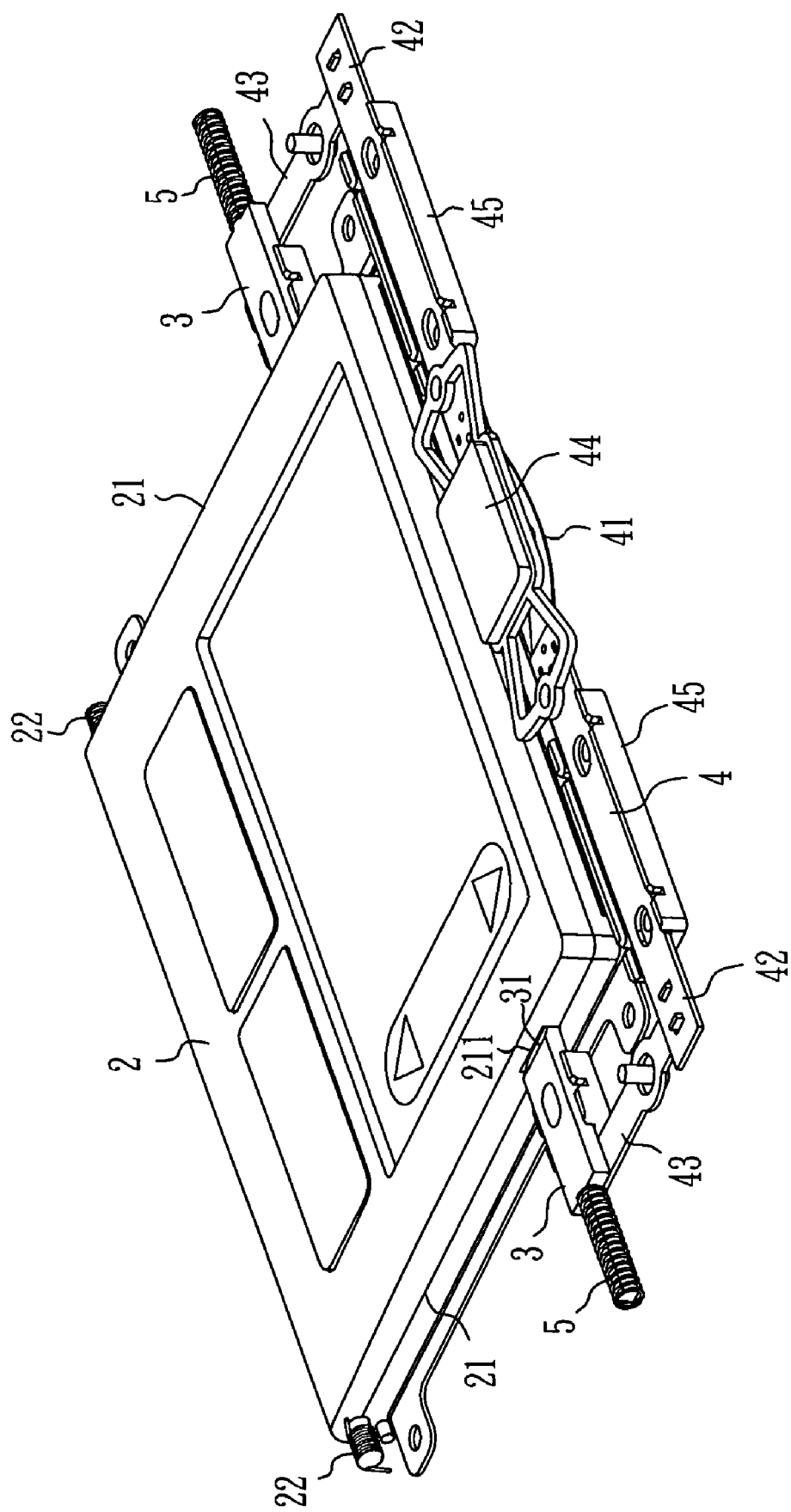
FIG. 3 is a perspective assembly view of the preferred embodiment of the present invention.

Referring to FIG. 2 and FIG. 3 and FIG. 1 again, a touch panel 2 is mounted on the top surface 111 of the base member 11 and the front side of the base plate 113. The touch panel 2 has two opposite lateral sides 21, two elongated locating grooves 211 respectively formed in the two opposite lateral sides 21 near one end and extending in direction along the length of the two opposite lateral sides 21, and two spring members 22 respectively provided at the two opposite lateral sides 21 near the other end remote from the elongated locating grooves 211 and adapted to impart a prestress to the touch panel 2 to lift the touch panel 2 from the top surface 111 of the base member 11.

Further, two latches 3 are slidably mounted in the base member 11 at two sides of the touch panel 2 in direction perpendicular to the two opposite lateral sides 21 of the touch panel 2 and respectively aimed at the locating grooves 211. Each latch 3 has a front engagement end 31 for engaging into the locating groove 211 at one lateral side of the touch panel 2, a rear connecting end 32, and a rear extension rod 321 backwardly extending from the rear connecting end 32. Further, two spring members 5 are respectively sleeved onto the rear extension rods 321 of the latches 3 and stopped between the rear end edge of the rear connecting end 32 of each of the latches 3 and a part of the base member 11 to impart a prestress to the latches 3 and to further force the front engagement end 31 of each of the latches 3 into the locating grooves 211 of the touch panel 2 respectively.

Further, an operating bar 4 is slidably provided in front of the top side 20 of the touch panel 2, having a springy middle convex portion 41 and two connecting end portions 42 equally spaced from the springy middle convex portion 41 at a distance. Two levers 43 are respectively pivoted with the respective middle part thereof to the base member 11 at two sides relative to the touch panel 2, each having one end respectively pivoted to the two connecting end portions 42 of the operating bar 4 and the other end respectively pivoted to the rear connecting end 32 of the latches 3. Further, a press member 44 is provided at the top side of the springy middle convex portion 41 of the operating bar 4.

In order to facilitate sliding of the operating bar 4 and the latches 3 on the base member 11, guide means are provided to guide movement of the operating bar 4 and the latches 3 on the base member 11. According to the present preferred embodiment, two first guide members 45 are fastened to the base member 11 in front of the top side 20 of the touch panel 2 and aligned in a line, each having a sliding groove 451 for receiving the operating bar 4 to guide movement of the operating bar 4 on the base member 11. Two second guide members 33 are fastened to the base member 11 at two sides relative to the touch panel 2, each having a sliding groove 331 for receiving the latches 3 to guide movement of the latches 3 on the base member 11.

Figure 4:
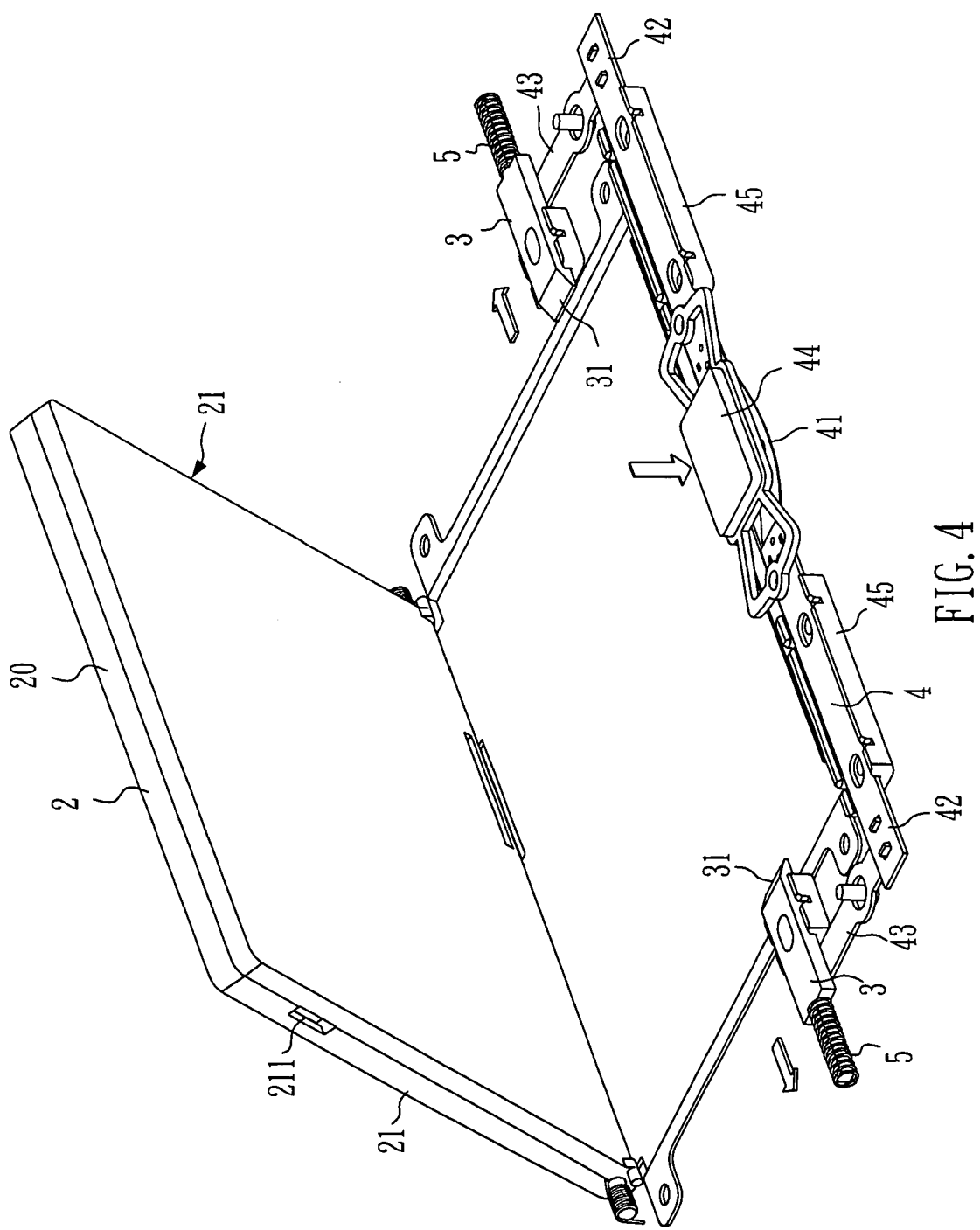
FIG. 4 is a schematic drawing showing the operation of the present invention.

Referring to FIG. 4, when the user wishes to use the dual-use portable computer 1 under the tablet PC mode, press the press member 44 to deform the operating bar 4 and to further extend the operating bar 4 axially. At this time, the levers 43 are forced by the two connecting end portions 42 of the operating bar 4 to move the latches 3 along the second guide members 33 relative to the base member 11, thereby causing the latches 3 to disengage the respective front engagement ends 31 from the locating grooves 211 of the touch panel 2, and therefore the touch panel 2 is rotated upward from the top surface 111 of the base member 11 by the spring force of the two spring members 22 to an inclined position relative to the base member 11, for enabling the back side of the swivel display 12 to be supported on the top side 20 of the touch panel 2.

Figure 5:
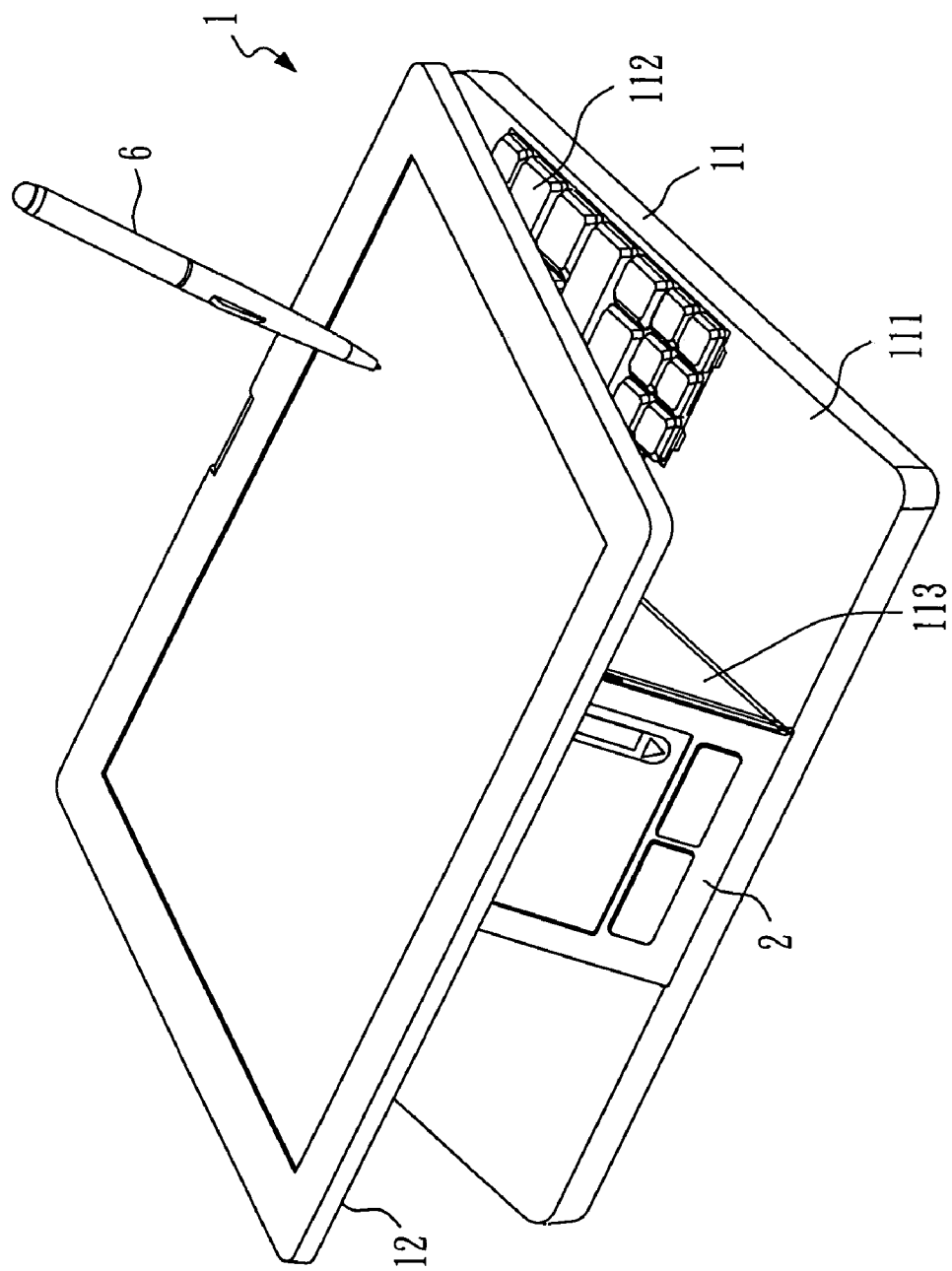
FIG. 5 is a schematic drawing showing the swivel display supported on the top side of the touch panel according to the present invention.

Referring to FIG. 5 and FIG. 4 again, when the touch panel 2 is set in the inclined position to support the back side of the swivel display 12, the swivel display 12 is kept in an inclined position relative to the base member 11. At this time, the user can use the touch pen 6 to operate the portable computer 1. Because the swivel display 12 is kept in an inclined position relative to the base member 11, the user can conveniently operate the touch pen 6 with less effort. This human technology and orthopedically engineered design enables the user to operate the portable computer 1 under the tablet PC mode conveniently and comfortably.

Although the present invention has been explained in relation to its preferred embodiments, it is to be understood that many other possible modifications and variations can be made without departing from the spirit and scope of the invention as hereinafter claimed.

What is claimed is:

1. A swivel display inclining structure used in a dual-use portable computer, which comprises a base member and a swivel display, said base member having a top surface, said swivel display being pivoted to said top surface and rotatable on said top surface and turnable relative to said base member, said swivel display inclining structure comprising:

a touch panel pivoted to said top surface of said base member, said touch panel having a locating groove in at least one lateral side thereof, and spring means adapted to impart a prestress to said touch panel to rotate relative to said base member to an inclined position;

at least one latch slidably mounted in said base member, said at least one latch having a front engagement end and a rear connecting end;

at least one spring member respectively connected between said at least one latch and said base member and adapted to force said front engagement end of said at least one latch engagement into said locating groove of said touch panel; and an operating bar comprising at least one connecting end portion respectively coupled to the rear connecting end of said at least one latch, and a springy convex portion;

wherein when pressed said springy convex portion of said operating bar, said operating bar is forced to slide on said base member and to move said front engagement end of said at least one latch away from said locating groove of said touch panel and to unlock said touch panel, for enabling said touch panel to be upwardly rotated relative to said base member to said inclined position by the prestress of said spring means for supporting said swivel display.

2. The swivel display inclining structure as claimed in claim 1, wherein said operating bar further comprising at least one lever, said at least one lever having a middle part pivoted to said base member, a first end pivoted to said at least one connecting end portion of said operating bar, and a second end pivoted to said rear connecting end of said at least one latch.

3. The swivel display inclining structure as claimed in claim 1, wherein said at least one latch has a rear extension rod backwardly extending from said rear connecting end thereof; said at least one spring member is respectively sleeved onto said rear extension rod of said at least one latch.

4. The swivel display inclining structure as claimed in claim 1, wherein said operating bar further comprising a press member provided at a top side of said springy convex portion thereof.

5. The swivel display inclining structure as claimed in claim 1, further comprising at least one guide member respectively fastened to said base member, said at least one guide member having a sliding groove for receiving said operating bar.

6. The swivel display inclining structure as claimed in claim 1, further comprising at least one guide member respectively fastened to said base member, said at least one guide member having a sliding groove for receiving said at least one latch.

7. The swivel display inclining structure as claimed in claim 1, wherein said base member further comprising a base plate mounted on said top surface thereof to secure said touch panel to said base member pivotally.

8. The swivel display inclining structure as claimed in claim 1, wherein said base member accommodates a keyboard.

* * * * *